US006465776B1

(12) United States Patent
Moini et al.

(10) Patent No.: US 6,465,776 B1
(45) Date of Patent: Oct. 15, 2002

(54) MASS SPECTROMETER APPARATUS FOR ANALYZING MULTIPLE FLUID SAMPLES CONCURRENTLY

(75) Inventors: Mehdi Moini; Longfei Jiang, both of Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/586,588

(22) Filed: Jun. 2, 2000

(51) Int. Cl.[7] .......................... B01D 59/44; H01J 49/00

(52) U.S. Cl. ....................... 250/285; 250/281; 250/282; 250/288

(58) Field of Search ................................ 250/282, 288, 250/281, 285, 289

(56) References Cited

U.S. PATENT DOCUMENTS

| | | | |
|---|---|---|---|
| 3,112,639 | A | 12/1963 | Maxwell |
| 3,119,251 | A | 1/1964 | Bowers |
| 3,236,603 | A | 2/1966 | Durrett et al. |
| 3,449,563 | A | 6/1969 | Brown |
| 3,578,969 | A | 5/1971 | Proskaver |
| 3,590,243 | A | 6/1971 | Perrin et al. |
| 3,800,602 | A | 4/1974 | Jones |
| 3,916,465 | A | 11/1975 | Jones |
| 3,933,047 | A | 1/1976 | Fowler |

(List continued on next page.)

OTHER PUBLICATIONS

R. Kostiainen & A. Bruins, Rapid Communications in Mass Spectrometry vol. 8, 549–558 (1994) Effect of Multiple Sprayers on Dynamic Range & Flow Rate Limitations in Electro–Spray and Ion Spray Mass Spectrometry.

R. Loo & R. Smith, American Society for Mass Spectrometry (1994) 5, 207–200 Investigation of the Gas–Phase Structure of Electrosprayed Proteins Using Ion–Molecule Reactions.

J. Shia & C. Wang, Journal of Mass Spectrometry, vol. 32, 247–250 (1997) JMS Letters—Applications of Multiple Channel Electrospray. Ionization Sources for Biological Sample Analysis.

Brochure–Micromass–Automated Parallel LC–MS for Modern Drug Discovery (1999).

*Primary Examiner*—John R. Lee
*Assistant Examiner*—David A. Vanore
(74) *Attorney, Agent, or Firm*—Fulbright & Jaworski, LLP

(57) ABSTRACT

A mass spectrometer utilizing an inlet nozzle having multiple atmospheric pressure inlets to provide multiple streams of different fluid samples such that their chemical contents can be analyzed simultaneously within a single mass spectrometer with limited or no interaction between the individual streams of sample. This capability is made possible by positioning the nozzle within a nozzle housing wherein the nozzle defines a plurality of orifices extending therethrough from the atmospheric pressure environment of the orifice inlets to the reduced air pressure environment of the nozzle outlets without allowing any mixing between the samples as they pass through the nozzle. Samples are provided to the nozzle by an electrospray ionization needle which simultaneously ionizes the fluid and supplies it to one individual nozzle orifice. Multiple electrospray ionization spray means are provided with one for each fluid sample to prevent mixing therebetween and to facilitate simultaneous analysis of different fluid samples within a mass spectrometer particularly as used within a time-of-flight mass spectrometer. The nozzle allows the samples to pass into a quadrupole ion guide which carries the sample into the detector apparatus for analysis thereof.

24 Claims, 2 Drawing Sheets

U.S. PATENT DOCUMENTS

| | | | | |
|---|---|---|---|---|
| 4,035,168 A | | 7/1977 | Jennings | |
| 4,201,913 A | | 5/1980 | Bursack et al. | |
| 4,209,696 A | | 6/1980 | Fite | |
| 4,298,795 A | | 11/1981 | Takeuchi et al. | |
| 4,367,645 A | | 1/1983 | Froment | |
| 4,507,555 A | | 3/1985 | Chang | |
| 4,562,351 A | | 12/1985 | Atherton et al. | |
| 4,570,068 A | | 2/1986 | Sakairi et al. | |
| 4,634,865 A | | 1/1987 | Conway | |
| 4,634,866 A | | 1/1987 | Conway | |
| 4,836,039 A | | 6/1989 | de Silva et al. | |
| 4,863,491 A | | 9/1989 | Brandt et al. | |
| 4,879,458 A | | 11/1989 | Brunfeldt et al. | |
| 4,883,958 A | | 11/1989 | Vestal | |
| 4,886,966 A | | 12/1989 | Matsunaga et al. | |
| 4,932,272 A | | 6/1990 | Hogg | |
| 4,933,548 A | | 6/1990 | Boyer et al. | |
| 4,977,320 A | | 12/1990 | Chowdhury et al. | |
| 4,982,090 A | | 1/1991 | Wittmaack | |
| 4,999,493 A | | 3/1991 | Allen et al. | |
| 5,006,315 A | | 4/1991 | Maroulis et al. | |
| 5,015,845 A | | 5/1991 | Allen et al. | |
| 5,086,226 A | | 2/1992 | Marcus | |
| 5,171,990 A | | 12/1992 | Mylchreest et al. | |
| 5,218,203 A | | 6/1993 | Eisele et al. | |
| 5,233,876 A | * | 8/1993 | LePack et al. | 73/863.23 |
| 5,236,668 A | | 8/1993 | Higdon | |
| 5,256,374 A | | 10/1993 | De Silva et al. | |
| 5,259,254 A | | 11/1993 | Zhu et al. | |
| 5,272,337 A | | 12/1993 | Thompson et al. | |
| 5,281,397 A | | 1/1994 | Ligon et al. | |
| 5,311,016 A | | 5/1994 | Villa-Aleman | |
| 5,345,079 A | | 9/1994 | French et al. | |
| 5,360,976 A | | 11/1994 | Young et al. | |
| 5,400,665 A | | 3/1995 | Zhu et al. | |
| 5,426,301 A | | 6/1995 | Turner | |
| 5,449,902 A | | 9/1995 | Onishi et al. | |
| 5,504,326 A | | 4/1996 | Reilly et al. | |
| 5,508,204 A | | 4/1996 | Norman | |
| 5,510,613 A | | 4/1996 | Reilly et al. | |
| 5,526,682 A | | 6/1996 | Jarrell et al. | |
| 5,565,677 A | | 10/1996 | Wexler et al. | |
| 5,574,277 A | | 11/1996 | Taylor | |
| 5,580,430 A | | 12/1996 | Balagopal et al. | |
| 5,597,467 A | | 1/1997 | Zhu et al. | |
| 5,633,496 A | | 5/1997 | Sakairi et al. | |
| 5,643,800 A | | 7/1997 | Tarantino et al. | |
| 5,661,038 A | | 8/1997 | Brenna et al. | |
| 5,668,370 A | | 9/1997 | Yano et al. | |
| 5,705,787 A | | 1/1998 | Karanassios | |
| 5,712,479 A | | 1/1998 | Reilly et al. | |
| 5,723,861 A | | 3/1998 | Carnahan et al. | |
| 5,736,741 A | | 4/1998 | Bertsch et al. | |
| 5,742,050 A | | 4/1998 | Amirav et al. | |
| 5,750,988 A | | 5/1998 | Apffel et al. | |
| 5,756,994 A | | 5/1998 | Bajic | |
| 5,763,877 A | | 6/1998 | Oishi et al. | |
| 5,770,860 A | | 6/1998 | Franzen | |
| 5,821,063 A | | 10/1998 | Patterson et al. | |
| 5,828,062 A | | 10/1998 | Jarrell et al. | |
| 5,834,772 A | | 11/1998 | Baumgardner et al. | |
| 5,841,136 A | | 11/1998 | Holle et al. | |
| 5,856,671 A | | 1/1999 | Henion et al. | |
| 5,869,344 A | | 2/1999 | Linforth et al. | |
| 5,879,949 A | | 3/1999 | Cole et al. | |
| 5,993,633 A | | 11/1999 | Smith et al. | |
| 6,093,929 A | * | 7/2000 | Javahery et al. | 250/282 |
| 6,207,954 B1 | * | 3/2001 | Andrien, Jr. et al. | 250/288 |

* cited by examiner

MASS SPECTROMETER APPARATUS FOR ANALYZING MULTIPLE FLUID SAMPLES CONCURRENTLY

BACKGROUND OF THE INVENTION

1. Field of the Invention

With the widespread usage of electrospray ionization techniques the atmospheric pressure ionization/mass spectrometer has become the most widely accepted device for chemical analysis. The present invention is also usable in those instances where thermospray ionization is still found to be functionally adequate. Atmospheric pressure interfaces have been used for many different types of mass spectrometers wherein charged droplets are formed in an atmospheric pressure electrospray ionization source which are then transported to a mass spectrometer analyzer through a capillary inlet. Most commercial devices utilize a single electrospray device in conjunction with a singular nozzle. Multiple electrospray needles, or ESI sprayers, have been used to enhance nebulization. Also use of dual ESI sprayers have been tried with a Y-shaped orifice defined within the nozzle in order to investigate electrosprayed proteins using ion-ion or ion-molecule reactions. In particular the accurate measurement of masses of organic compounds has been another use of this system for the purposes of avoiding suppression of the sample by the reference. Standard dual ESI sprayers have also been used in various configurations of mass spectrometer manufacturers. It is important, however, to know that the present invention is particularly novel since only one nozzle has been used heretofore and the spraying mists are mixed prior to entering the first stage of pumping. Automation of the accurate measurement of multiple organic and biological compounds using electrospray ionization has become increasingly important. Double-focusing mass spectrometers have very high resolution and have been used to confirm the chemical composition of organic compounds. However, the more modern time of flight mass spectrometer has been used for chemical composition analysis most recently especially due to their lower cost when compared to double-focusing units. High resolution of the sector instruments is an important factor for achieving high mass accuracy by resolving peak interferences. However, when dealing with the analysis of complex mixtures long scan times used by the sector instrument may not be compatible with the narrow peaks generated under micro and capillary high performance liquid chromatography and capillary electrophoresis. Recent advances in the commonly available configurations of the time-of-flight mass spectrometers have made it possible to acquire complete spectra with adequate resolution during a very short time period. These advances in the time-of-flight mass spectrometer, as well as their lower cost, when compared to double focusing mass spectrometers makes their usage in automated analysis much more cost feasible. The concept of present invention, however, is clearly less expensive and more beneficial using any type of mass spectrometer and is not contemplated to be restricted to only time-of-flight mass spectrometer configurations. The present invention does provide a means for simultaneously measuring multiple fluid sample inputs in a mass spectrometer that is particularly advantageous when utilizing the time-of-flight mass spectrometer.

2. Description of the Prior Art

Numerous prior art devices have been designed in the spectrometer field for enhancing analytical techniques such as shown in U.S. Pat. No. 3,112,639 patented Dec. 3, 1963 to C. T. Maxwell and assigned to Beckman Instruments, Inc. on a “Dual Column Gas Chromatograph And Method For Analysis”; and U.S. Pat. No. 3,119,251 patented Jan. 28, 1964 to M. A. Bowers and assigned to Standard Oil Company on a “Multiple Column Gas Chromatography”; and U.S. Pat. No. 3,236,603 patented Feb. 22, 1966 to L. R. Durrett et al and assigned to Shell Oil Company on a “Multiple-Column Gas Chromatographic Apparatus”; and U.S. Pat. No. 3,449,563 patented Jun. 10, 1969 to H. W. Brown and assigned to Varian Associates on a “Sample Insertion Probe Having Integral Sample Introduction Control Means And Mass Spectrometer Means Using Same”; and U.S. Pat. No. 3,578,969 patented May 18, 1971 to W. Proskauer and assigned to Electronic Associates Inc. on a “Solid Sample Inlet System For A Mass Spectrometer”; and U.S. Pat. No. 3,590,243 patented Jun. 29, 1971 to R. Perrin et al and assigned to Avco Corp. on a “Sample Insertion Vacuum Lock And Probe Assembly For Mass Spectrometers”; and U.S. Pat. No. 3,800,602 patented Apr. 2, 1974 to A. W. Jones and assigned to Hooker Chemical Corporation on a “Multi-Stream Gas Chromatographic Method And Apparatus”; and U.S. Pat. No. 3,916,465 patented Nov. 4, 1975 to A. W. Jones and assigned to Hooker Chemicals & Plastics Corporation on a “Multi-Stream Gas Chromatographic Method And Apparatus”; and U.S. Pat. No. 3,933,047 patented Jan. 20, 1976 to P. Fowler and assigned to Cabot Corporation on a “Method And Means For Gas Sampling In Mass Spectrometry”; and U.S. Pat. No. 4,035,168 patented Jul. 12, 1977 to W. G. Jennings and assigned to The Regents of the University of California on a “Non-reactive Inlet Splitter For Gas Chromatography And Method”; and U.S. Pat. No. 4,201,913 patented May 6, 1980 to W. W. Bursack et al and assigned to Honeywell Inc. on a “Sampling System For Mass Spectrometer”; and U.S. Pat. No. 4,209,696 patented Jun. 24, 1980 to W. Fite on “Methods And Apparatus For Mass Spectrometric Analysis Of Constituents In Liquids”; and U.S. Pat. No. 4,298,795 patented Nov. 3, 1981 to T. Takeuchi et al and assigned to Japan Spectroscopic Co. Ltd. on a “Method And Apparatus For Introducing Samples To A Mass Spectrometer”; and U.S. Pat. No. 4,367,645 patented Jan. 11, 1983 to G. F. Froment and assigned to Kinetics Technology International Corporation on a “Hot Gas Sampling”; and U.S. Pat. No. 4,507,555 patented Mar. 26, 1985 to C. Chang on a “Parallel Mass Spectrometer”; and U.S. Pat. No. 4,562,351 patented Dec. 31, 1985 to P. Atherton et al and assigned to VG Instruments Group Limited on a “Sample Introduction Device For Mass Spectrometers”; and U.S. Pat. No. 4,570,068 patented Feb. 11, 1986 to M. Sakairi et al and assigned to Hitachi, Ltd. on an “Interface For Liquid Chromatograph And Mass Spectrometer”; and U.S. Pat. No. 4,634,865 patented Jan. 6, 1987 to J. K. Conway and assigned to Prutec Limited on an “Introduction Of Samples Into A Mass Spectrometer”; and U.S. Pat. No. 4,634,866 patented Jan. 6, 1987 to J. K. Conway and assigned to Prutec Limited on an “Introduction Of Samples Into A Mass Spectrometer”; and U.S. Pat. No. 4,836,039 patented Jun. 6, 1989 to K. N. de Silva et al and assigned to Canadian Patents & Development Limited on a “Method And Apparatus For Introduction Of A Particulate Sample For Analysis”; and U.S. Pat. No. 4,863,491 patented Sep. 5, 1989 to R. Brandt et al and assigned to Hewlett-Packard on an “Interface For Liquid Chromatography-Mass Spectrometry Systems”; and U.S. Pat. No. 4,879,458 patented Nov. 7, 1989 to R. J. Brunfeldt et al and assigned to R. J. Brunfeldt Company, Inc. on an “Automatic Sample System For Mass Spectrometer”; and U.S. Pat. No. 4,883,958 patented Nov. 28, 1989 to M. L.

Vestal and assigned to 501 Vestec Corporation on an "Interface For Coupling Liquid Chromatography To Solid Or Gas Phase Detectors"; and U.S. Pat. No. 4,886,966 patented Dec. 12, 1989 to H. Matsunaga et al and assigned to Kabushiki Kaisha Toshiba on an "Apparatus For Introducing Samples Into An Inductively Coupled, Plasma Source Mass Spectrometer"; and U.S. Pat. No. 4,932,272 patented Jun. 12, 1990 to W. T. Hogg and assigned to Molson Breweries, on a "Liquid Sampling Valve For Gas Chromatograph"; and U.S. Pat. No. 4,933,548 patented Jun. 12, 1990 to R. Boyer et al and assigned to Compagnie Generale des Matieres on a "Method And Device For Introducing Samples For A Mass Spectrometer"; and U.S. Pat. No. 4,977,320 patented Dec. 11, 1990 to S. Chowdhury et al and assigned to The Rockefeller University on an "Electrospray Ionization Mass Spectrometer With New Features"; and U.S. Pat. No. 4,982, 090 patented Jan. 1, 1991 to K. Wittmaack and assigned to Gesellschaft fur Strahlen-und Umweltforschung mbH (GSF) on a "Method And Apparatus For The Quantitative, Depth Differential Analysis Of Solid Samples With The Use Of Two Ion Beams"; and U.S. Pat. No. 4,999,493 patented Mar. 12, 1991 to M. Allen et al and Assigned to Vestec Corporation on an "Electrospray Ionization Interface And Method For Mass Spectrometry"; and U.S. Pat. No. 5,006,315 patented Apr. 9, 1991 to P. Maroulis et al and assigned to Air Products and Chemicals, Inc. on an "Automated Preparative Gas Chromatograph"; and U.S. Pat. No. 5,015,845 patented May 14, 1991 to M. Allen et al and assigned Vestec Corporation on an "Electrospray Method For Mass Spectrometry"; and U.S. Pat. No. 5,086,226 patented Feb. 4, 1992 to R. K. Marcus and assigned to Clemson University on a "Device For Radio Frequency Powered Glow Discharge Spectrometry With External Sample Mount Geometry"; and U.S. Pat. No. 5,171,990 patented Dec. 15, 1992 to I. Mylchreest et al and assigned to Vinnigan Corporation on an "Electrospray Ion Source With Reduced Neutral Noise And Method; and U.S. Pat. No. 5,218,203 patented Jun. 8, 1993 to F. L. Eisele et al and assigned to Georgia Tech Research Corporation on an "Ion Source And Sample Introduction Method And Apparatus Using Two Stage Ionization For Producing Sample Gas Ions"; and U.S. Pat. No. 5,236, 668 patented Aug. 17, 1993 to W. R. Higdon on a "Detachable Column Cartridge Gas Chromatograph"; and U.S. Pat. No. 5,256,374 patented Oct. 26, 1993 to K. N. De Silva et al and assigned to Her Majesty the Queen in right of Canada, as represented by the Minister of Energy Mines and Resources on a "Sample Introduction For Spectrometers"; and U.S. Pat. No. 5,259,254 patented Nov. 9, 1993 to J. Zhu et al and assigned to Cetac Technologies, Inc. on a "Sample Introduction System For Inductively Coupled Plasma And Other Gas-Phase, Or Particle, Detectors Utilizing Ultrasonic Nebulization, And Method Of Use"; and U.S. Pat. No. 5,272,337 patented Dec. 21, 1993 to C. Thompson et al and assigned to Martin Marietta Energy Systems, Inc. on a "Sample Introducing Apparatus And Sample Modules For Mass Spectrometer"; and U.S. Pat. No. 5,281,397 patented Jan. 25, 1994 to W. V. Ligon et al and assigned to General Electric Company on an "Adjustable Open-Split Interface For A Gas Chromatograph And A Mass Spectrometer"; and U.S. Pat. No. 5,311,016 patented May 10, 1994 to E. Villa-Aleman and assigned to The United States of America as represented by the United States Department of Energy on an "Apparatus For Preparing A Sample For Mass Spectrometry"; and U.S. Pat. No. 5,345,079 patented Sep. 6, 1994 to J. B. French et al and assigned to MDS Health Group Limited on an "Apparatus And Method For Liquid Sample Introduction"; and U.S. Pat. No. 5,360,976 patented Nov. 1, 1994 to D. T. Young et al and assigned to Southwest Research Institute on a "Time Of Flight Mass Spectrometer, Ion Source, And Methods Of Preparing A Sample For Mass Analysis and Of Mass Analyzing A Sample"; and U.S. Pat. No. 5,400,665 patented Mar. 28, 1995 to J. Zhu et al and assigned to Cetac Technologies Incorporated on a "Sample Introduction System For Inductively Coupled Plasma And Other Gas-Phase, Or Particle, Detectors Utilizing An Enclosed Filter Solvent Removal System, And Method Of Use"; and U.S. Pat. No. 5,426,301 patented Jun. 20, 1995 to P. turner on an "Off-Axis Interface For A Mass Spectrometer"; and U.S. Pat. No. 5,449,902 patented Sep. 12, 1995 to K. Onishi et al and assigned to Hitachi, Ltd. and Takeda Chemical Industries, Ltd. on an "Apparatus For Directly Coupling Analytical Column With Mass Spectrometer"; and U.S. Pat. No. 5,504,326 patented Apr. 2, 1996 to J. Reilly et al and assigned to Indiana University Foundation on a "Spatial-Velocity Correlation Focusing In Time-Of-Flight Mass Spectrometry"; and U.S. Pat. No. 5,508,204 patented Apr. 16, 1996 to E. J. Norman and assigned to Norman Clinical Laboratories, Inc. on a "Multiple Sample Sequential Chemical Analysis"; and U.S. Pat. No. 5,510,613 patented Apr. 23, 1996 to J. Reilly et al and assigned to Indiana University Foundation on a "Spatial-Velocity Correlation Focusing In Time-Of-Flight Mass Spectrometry"; and U.S. Pat. No. 5,526,682 patented Jun. 18, 1996 to J. A. Jarrell et al and assigned to Waters Investments Limited on a "Method And Apparatus For Analyzing Sample Solutions"; and U.S. Pat. No. 5,565,677 patented Oct. 15, 1996 to A. S. Wexler et al and assigned to The University of Delaware on an "Aerodynamic Nozzle For Aerosol Particle Beam Formation Ink To A Vacuum"; and U.S. Pat. No. 5,574,277 patented Nov. 12, 1996 to S. J. Taylor and assigned to Graseby Dynamics Limited on an "Introduction Of Samples Into An Ion Mobility Spectrometer"; and U.S. Pat. No. 5,580,430 patented Dec. 3, 1996 to S. H. Balagopal et al and assigned to Ceramatec, Inc. on a "Selective Metal Cation-Conducting Ceramics"; and U.S. Pat. No. 5,597,467 patented Jan. 28, 1997 to J. Zhu et al and assigned to Cetac Technologies Inc. on a "System For Interfacing Capillary Zone Electrophoresis And Inductively Coupled Plasma-Mass Spectrometer Sample Analysis Systems, And Method Of Use"; and U.S. Pat. No. 5,661,038 patented Aug. 26, 1997 to J. T. Brenna et al and assigned to Cornell Research Foundation, Inc. on an "Interface System For Isotopic Analysis Of Hydrogen"; and U.S. Pat. No. 5,633,496 patented May 27, 1997 to M. Sakairi et al and assigned to Hitachi, Ltd. on a "Mass Spectrometry Apparatus"; and U.S. Pat. No. 5,643,800 patented Jul. 1, 1997 to E. R. Tarantino et al and assigned to Hewlett-Packard Company on a "Method Of Preparing A Sample For Analysis By Laser Desorption Ionization Mass Spectrometry"; and U.S. Pat. No. 5,668,370 patented Sep. 16, 1997 to M. Yano et al and assigned to Hitachi, Ltd. on an "Automatic Ionization Mass Spectrometer With A Plurality Of Atmospheric Ionization Sources"; and U.S. Pat. No. 5,705,787 patented Jan. 6, 1998 to V. Karanassios and assigned to The University of Waterloo on a "Sample Introduction System"; and U.S. Pat. No. 5,712,479 patented Jan. 27, 1998 to J. Reilly et al and assigned to Indiana University Foundation on a "Spatial-Velocity Correlation Focusing In Time-Of-Flight Mass Spectrometry"; and U.S. Pat. No. 5,723,861 patented Mar. 3, 1998 to B. L. Carnahan et al and assigned to Mine Safety Appliances Company on a "Recirculating Filtration System For Use With A Transportable Ion Mobility Spectrometer"; and U.S. Pat. No. 5,736,741 patented Apr. 7, 1998 to J. Bertsch et al and assigned to Hewlett Packard Company on an "Ionization Chamber And Mass Spectrometry System Containing An Easily Removable And Replaceable Capillary"; and U.S. Pat. No. 5,742,050 patented Apr. 21, 1998 to A. Amirav et al and assigned to Aviv Amirav on a "Method And Apparatus For Sample Introduction Into A Mass Spectrometer For Improving A Sample Analysis"; and U.S. Pat. No. 5,750,988 patented May 12, 1998 to J. A. Apffel et al and assigned to Hewlett-Packard Company on an "Orthogonal Ion Sampling For APCI Mass Spectrometry"; and U.S. Pat. No. 5,763,877 patented Jun. 9, 1998 to K. Oishi et al and assigned to Hitachi, Ltd. on an "Analyzer Using Plasma And Analysis Method Using Plasma, Interface Used For The Same And Sample Introducing Component Used For The Same"; and U.S. Pat. No. 5,770,860 patented Jun. 23, 1998 to J. Franzen on a "Method For Loading Sample Supports For Mass Spectrometers"; and U.S. Pat. No. 5,821,063 patented Oct. 13, 1998 to D. H. Patterson et al and assigned to PerSeptive Biosystems, Inc. on "Methods For Sequencing Polymers Using Mass Spectrometry"; and U.S. Pat. No. 5,834,772 patented Nov. 10, 1998 to J. E. Baumgardner et al on a "Mass Spectrometer Probe For Measurements Of Gas Tensions"; and U.S. Pat. No. 5,841,136 patented Nov. 24, 1998 to A. Holle et al and assigned to Bruker-Franzen Amalytik, GmbH on a "Device And Method For Introduction Of Sample Supports Into A Mass Spectrometer"; and U.S. Pat. No. 5,856,671 patented Jan. 5, 1999 to J. D. Henion et al and assigned to Cornell Research Foundation, Inc. on a "Capillary Electrophoresis-Mass Spectrometry Interface"; and U.S. Pat. No. 5,869,344 patented Feb. 9, 1999 to R. Linforth et al and assigned to Micromass UK Limited on an "Apparatus And Methods For The Analysis Of Trace Constituents In Gases"; and U.S. Pat. No. 5,879,949 patented Mar. 9, 1999 to R. B. Cole et al and assigned to Board of Supervisors of Louisiana State University & Agricultural and Mechanical College on an "Apparatus And Method For Rapid On-Line Electrochemistry And Mass Spectrometry"; and U.S. Pat. No. 5,993,633 patented Nov. 30, 1999 to R. Smith et al and assigned to Battelle Memorial Institute on a "Capillary Electrophoresis Electrospray Ionization Mass Spectrometry Interface".

SUMMARY OF THE INVENTION

The present invention provides an improved mass spectrometer apparatus which can be used to analyze numerous fluid samples simultaneously. It includes a detector apparatus for monitoring fluid samples moving therewithin for providing analytical information thereon such as mass or charge. The detector apparatus also defines a detector inlet therein adapted to receive fluid samples. The detector apparatus preferably is a time-of-flight mass spectrometer which facilitates analyzing of different fluid samples passing therethrough in parallel relation to one another at a high speed and at minimal cost. Use with other types of mass spectrometers other than the time-of-flight design is also contemplated under this invention.

The apparatus further includes a quadrupole ion guide positioned in fluid flow communication with the detector and adapted to guide the movement of fluid samples thereinto for analysis. The quadrupole ion guide also defines a guide inlet for receiving fluid sample for analysis and a guide outlet in fluid flow communication with respect to the detector inlet in order to guide movement of the fluid sample thereinto. The quadrupole ion guide includes a guide pump in fluid flow communication therewith which is adapted to reduce the air pressure therein to a level of approximately 20 millitorr. The quadrupole ion guide may also include a supplemental pumping apparatus to facilitate maintaining of the 20 millitorr air pressure level. A skimmer may also be included positioned over the guide inlet of the quadrupole ion guide to facilitate movement of fluid sample in parallel with respect to other fluid samples into the quadrupole ion guide.

A nozzle is used configured with a plurality of sampling orifices extending therethrough to facilitate parallel entry of multiple fluid samples simultaneously through the skimmer. The sampling orifices are isolated from one another within the nozzle to prevent mixing of fluid samples passing therethrough. In this manner each of the sampling orifices will define an individual sampling inlet and sampling outlet which are in fluid flow communication together through its respective sampling orifice. The sampling inlets of the sampling orifices within the nozzles are preferably spatially separated from one another by a sufficient distance to prevent mixing of the unique fluid samples introduced into each of the sampling inlets. The nozzle orifices are preferably angularly oriented with respect to one another in such a manner that they converge at the sampling outlets thereof. In this configuration the spatial separation between the sampling outlets is less than the spacing between the sampling inlets. Preferably sampling orifices are configured with an internal diameter sufficiently small in order to maintain the desired low pressure level within the primary reduced pressure chamber. This design consideration is particular advantageous to maintain low pressure levels in the chamber when multiple channels are used.

A nozzle heating device is also included which is operative to heat the nozzle preferably to a temperature of approximately 150 degrees Centigrade to facilitate the movement of fluid sample therethrough. A sample housing is also included which defines a primary reduced pressure chamber therewithin. The sampling housing includes a sample pump designed to reduce the air pressure therein to approximately five torr in order to facilitate fluid sample movement therethrough. The nozzle is preferably positioned extending through the sample housing into the primary reduced pressure chamber with each of the sampling outlets thereof positioned within the primary reduced pressure chamber to be exposed to an environment of below atmospheric pressure and with each of the sampling inlets positioned external to the sampling housing to be exposed to ambient atmospheric pressure.

The guide pump is operative to reduce the air pressure within the quadrupole ion guide to a level well below the atmospheric pressure and also below the level within the primary reduced pressure chamber. A fluid introduction device is also operatively positioned adjacent to each of the sampling inlets of the nozzle means in an environment of ambient atmospheric pressure to separately provide fluid sample to each of the sampling inlets while minimizing mixing therebetween. This fluid introduction means preferably includes a plurality of electrospray ionization spray devices each of which is associated with one of the sampling inlets such that each individual device is adapted to receive a different and unique fluid sample and provide it to the sampling inlet without any mixing therebetween.

It is an object of the present invention to provide an improved mass spectrometer apparatus which is operative to analyze multiple fluid samples concurrently wherein cost is minimized by utilizing a time-of-flight spectrometer detector apparatus.

It is an object of the present invention to provide an improved mass spectrometer apparatus which is operative to analyze multiple fluid samples concurrently wherein the number of moving parts are minimized to limit down time.

It is an object of the present invention to provide an improved mass spectrometer apparatus which is operative to analyze multiple fluid samples concurrently wherein reliability is significantly enhanced.

It is an object of the present invention to provide an improved mass spectrometer apparatus which is operative to analyze multiple fluid samples concurrently wherein multiple streams of different unique fluid samples are maintained almost completely separated with virtually no mixing to facilitate analysis thereof by a time-of-flight mass spectrometer detector apparatus.

It is an object of the present invention to provide an improved mass spectrometer apparatus which is operative to analyze multiple fluid samples concurrently wherein samples can be received from various types of input sources such as liquid chromatography or capillary electrophoresis or syringe pumps.

It is an object of the present invention to provide an improved mass spectrometer apparatus which is operative to analyze multiple fluid samples concurrently wherein one of the sampling orifices can be used to introduce a reference compound to facilitate accuracy in measurement.

It is an object of the present invention to provide an improved mass spectrometer apparatus which is operative to analyze multiple fluid samples concurrently wherein the sample analysis time is greatly decreased due to the parallel analysis of multiple samples.

It is an object of the present invention to provide an improved mass spectrometer apparatus which is operative to analyze multiple fluid samples concurrently wherein costs are minimized by allowing a plurality of different samples to be analyzed simultaneously.

It is an object of the present invention to provide an improved mass spectrometer apparatus which is operative to analyze multiple fluid samples concurrently wherein adaption to spectrometers already in the field can be upgraded with minimal modifications thereby eliminating the high cost of purchasing new instruments.

It is an object of the present invention to provide an improved mass spectrometer apparatus which is operative to analyze multiple fluid samples concurrently wherein the problems associated with multiple nozzle orifices such as the increase in internal pressure at the nozzle housing and the quadrupole ion guide can be overcome by the use of supplemental devices.

It is an object of the present invention to provide an improved mass spectrometer apparatus which is operative to analyze multiple fluid samples concurrently wherein individual electrospray ionization devices can be utilized with one for each individual unique fluid sample.

It is an object of the present invention to provide an improved mass spectrometer apparatus which is operative to analyze multiple fluid samples concurrently wherein interaction between the individual samples and between the samples and any reference compound utilized is minimized.

It is an object of the present invention to provide an improved mass spectrometer apparatus which is operative to analyze multiple fluid samples concurrently wherein the current low cost of time-of-flight mass spectrometers as compared to double focusing mass spectrometers is a distinctive cost advantage.

It is an object of the present invention to provide an improved mass spectrometer apparatus which is operative to analyze multiple fluid samples concurrently wherein interference is minimized by utilizing multiple ESI sprayers.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
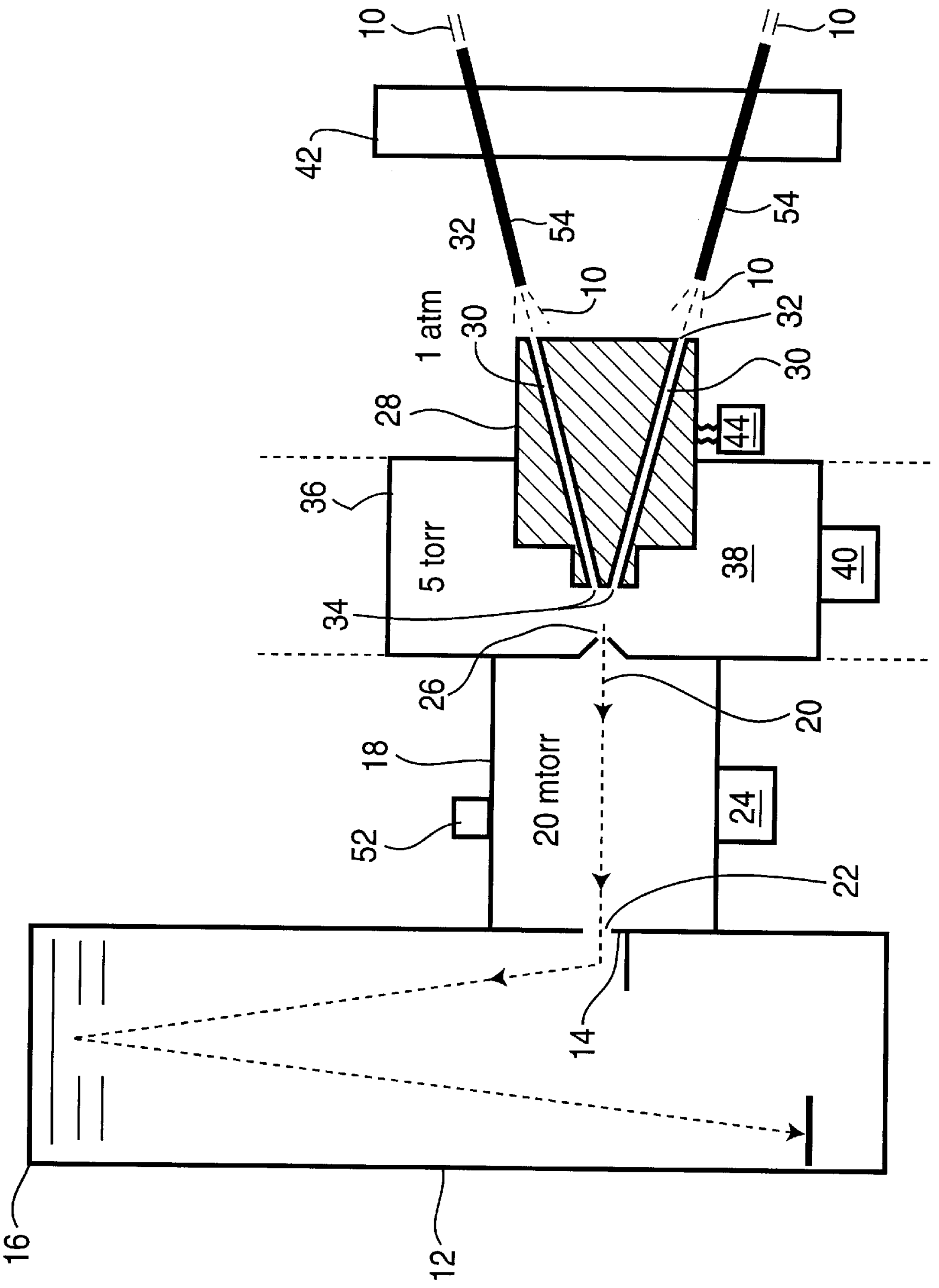
FIG. 1 is a perspective illustration of an embodiment of the improved mass spectrometer apparatus of the present invention showing a nozzle with two sampling orifices and the use of two electrospray ionization spray devices.
Figure 2:
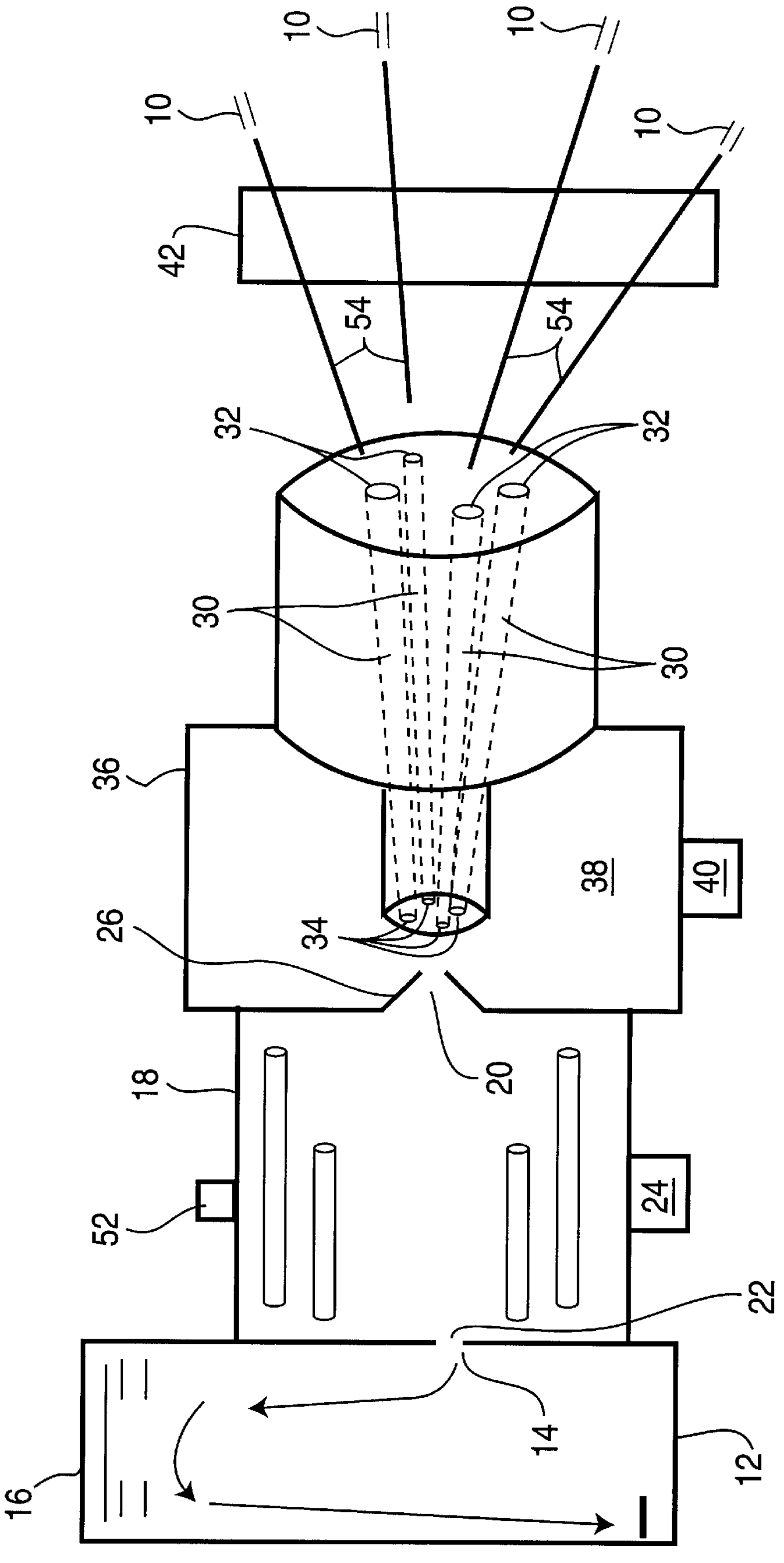
FIG. 2 is a perspective illustration of an embodiment of the improved mass spectrometer apparatus of the present invention showing a nozzle with four sampling orifices and the use of four electrospray ionization spray devices.

The present invention provides an improved mass spectrometer apparatus 16 which preferably will comprise a time-of-flight mass spectrometer which is utilized as a detector apparatus 12 for analyzing fluid samples passing therethrough. The present invention provides a unique apparatus for ultimately introducing these fluid samples 10 into the detector apparatus 12 to facilitate measurement of mass and/or charge thereof.

Initially the fluid samples 10 are dispensed from common sources of such fluid samples such as capillary electrophoresis or high performance liquid chromatography or a syringe pump. These types of devices will provide a source of the unique fluid sample 10 to the fluid introduction means 42. Preferably this fluid introduction means 42 comprises a plurality of electrospray ionization spray devices 54 each adapted to receive one out of a plurality of different unique fluid samples 10. These samples are then ionized and sprayed adjacent the nozzle Nozzle 28 preferably defines a plurality of sampling orifices 30 extending therethrough. Each of these orifices includes a sampling inlet 32 positioned adjacent to the outlet of one of the electrospray ionization spray devices 54. The sampling orifice 30 also defines a sampling outlet 34 at the opposite end of the nozzle 28 adjacent to a flow restrictor means such as a skimmer 26. Each of the different fluid samples 10 are ionized and sprayed by their associated individual electrospray ionization spray device 54 at a point adjacent the sampling inlet 32 of the nozzle 28. The fluid sample then travels through the sampling orifice 30 to the individual sampling outlets 34. These fluid samples 10 then pass in parallel through the skimmer 26 into the quadrupole ion guide 18.

A sample housing 36 will extend over the nozzle and the guide inlet means 20 of the quadrupole ion guide 18. A sample pumping means 40 will be connected to the sampling housing 36 in such a manner as to define therein a primary reduced pressure chamber 38. This reduced pressure chamber 38 will have air pressure therein maintained at a level significantly below atmospheric pressure.

It is important to note that the individual electrospray ionization devices 54 will introduce the individual unique fluid sample 10 to the sampling inlets 32 in an environment of ambient atmospheric pressure. However, the sampling outlet 34 will be positioned within the sampling housing 36 and thereby be positioned within the primary reduced pressure chamber 38 to be exposed to the reduced pressure therein of approximately five torr. This pressure is reduced by operation of the sample pumping means 40.

After the fluid sample 10 passes through the sampling housing 36 it will pass then through the skimmer means 26 into the quadrupole guide inlet 20. The quadrupole ion guide 18 will then guide the individual fluid sample 10 moving in parallel to the guide outlet 22 for introduction into the time-of-flight mass spectrometer and detector apparatus 16 and 14. The atmospheric pressure within the quadrupole ion guide 18 will be maintained at a level lower than the air pressure level within the sample housing 36 and will normally be approximately twenty millitorr. This reduced pressure will be achieved by the operation of the guide pumping means 24 and may require a supplemental guide pumping means 52 especially when more than two individual orifices are defined in the nozzle 28. As such the apparatus of the present invention has the unique advantage of introducing samples from an electrospray ionization spray device at atmospheric pressure into a nozzle which prevents mixing between individual unique fluid samples 10 such that they will move in parallel through a time-of-flight mass spectrometer 16 to facilitate accurate analysis thereof. This apparatus is useful for analyzing numerous analytes simultaneously such as analyzing eight or more entirely unique separate fluid samples 10.

The configuration described above is unique in that it allows multiple streams of liquid samples to be analyzed to pass into a mass spectrometer in parallel such that the chemical contents can be analyzed simultaneously with only a single mass spectrometer while maintaining minimal or no interaction between these fluid samples. This apparatus is also useful since a reference standard can be utilized to be passed through one of the nozzle orifices to increase the accuracy of the sample measurements. The apparatus of the present invention becomes extremely advantageous when the difference in cost is realized between a time-of-flight mass spectrometer apparatus 16 and a double focusing mass spectrometer which is much more costly.

It should be appreciated that the apparatus of the present invention can be multiplied such that two to eight or even a greater number of individual unique samples can be simultaneously analyzed by a single spectrometer. There are specific special considerations that would need to be considered such as the introduction of supplemental pumping devices to maintain the pressure differential over the nozzle and the pressure level within the quadrupole ion guide 18 at the desired levels.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An improved mass spectrometer apparatus being operative to analyze multiple separate samples concurrently comprising:

A. a detector apparatus for monitoring fluid samples moving therewithin to provide analytic information thereon, said detector apparatus defining a detector inlet means therein adapted to receive fluid samples introduced therethrough;

B. a nozzle means defining a plurality of sampling orifices extending therethrough to facilitate parallel entry of multiple fluid samples simultaneously toward said detector inlet means of said detector apparatus, each of said sampling orifices defining a sampling inlet and a sampling outlet being in fluid flow communication with respect to one another through said sampling orifice;

C. a sampling housing defining a primary reduced pressure chamber therein, said sampling housing including a sampling pumping means to reduce the air pressure therein to below atmospheric pressure to facilitate fluid sample movement therethrough, said nozzle means being positioned extending through said sampling housing into said primary reduced pressure chamber with each of said sampling outlets thereof positioned within said primary reduced pressure chamber to be exposed to an environment of below atmospheric pressure and with each of said sampling inlets positioned external to said sampling housing to be exposed to ambient atmospheric pressure; and D. fluid introduction means operatively positioned adjacent each of said sampling inlets of said nozzle means to separately provide a fluid sample to each said sampling inlet without any mixing therebetween to facilitate analysis by said detector apparatus, wherein the multiple fluid samples are maintained with minimal interaction between the multiple fluid samples.

2. An improved mass spectrometer apparatus being operative to analyze fluid samples concurrently as defined in claim 1 further comprising a quadrupole ion guide positioned between said primary reduced chamber means and said detector inlet means of said detector apparatus, said quadrupole ion guide being in fluid flow communication with said detector apparatus and adapted to guide the movement of fluid samples into said detector means for facilitating analysis thereof, said quadrupole ion guide defining a guide inlet means for receiving fluid sample for analysis and a guide outlet means in fluid flow communication with respect to said detector inlet means in order to guide movement of fluid sample thereinto, said quadrupole ion guide including a guide pumping means in fluid flow communication therewith adapted to reduce air pressure therein to a level below atmospheric pressure.

3. An improved mass spectrometer apparatus being operative to analyze fluid samples concurrently as defined in claim 1 wherein said sampling orifices are isolated from one another to prevent any fluid flow communication therebetween within said nozzle means.

4. An improved mass spectrometer apparatus being operative to analyze fluid samples concurrently as defined in claim 1 wherein said sampling inlets of said sampling orifices within said nozzle means are spatially separated from one another by a sufficient distance to prevent mixing of fluid samples introduced into each of said sampling inlets.

5. An improved mass spectrometer apparatus being operative to analyze fluid samples concurrently as defined in claim 4 wherein said sampling orifices within said nozzle means are angularly oriented with respect to one another to converge at said sampling outlets thereof such that the spatial separation between said sampling outlets is less than the spacing between said sampling inlets.

6. An improved mass spectrometer apparatus being operative to analyze fluid samples concurrently as defined in claim 2 wherein said guide pumping means is operative to reduce the air pressure within said quadrupole ion guide to a level less than the pressure within said sampling housing.

7. An improved mass spectrometer apparatus being operative to analyze fluid samples concurrently as defined in claim 1 wherein said detector apparatus includes a time-of-flight mass spectrometer means.

8. An improved mass spectrometer apparatus being operative to analyze fluid samples concurrently as defined in claim 1 further comprising a nozzle heating means operative to heat said nozzle means to approximately 150 degrees Centigrade to facilitate passing of fluid sample therethrough.

9. An improved mass spectrometer apparatus being operative to analyze fluid samples concurrently as defined in claim 1 wherein one of said sampling orifices within said nozzle means is provided for each fluid sample to be simultaneously analyzed by said detector apparatus.

10. An improved mass spectrometer apparatus being operative to analyze fluid samples concurrently as defined in claim 1 wherein said nozzle means defines a first sampling orifice and a second sampling orifice therethrough each adapted to receive a different unique fluid sample introduced thereinto by said fluid introduction means.

11. An improved mass spectrometer apparatus being operative to analyze fluid samples concurrently as defined in claim 1 wherein said nozzle means defines four fluid sampling orifices extending therethrough each adapted to receive a different fluid sample introduced thereinto by said fluid introduction means.

12. An improved mass spectrometer apparatus being operative to analyze fluid samples concurrently as defined in claim 2 further including a supplemental guide pumping means operatively secured with respect to said quadrupole ion gun to facilitate maintaining of the reduced air pressure environment therewithin.

13. An improved mass spectrometer apparatus being operative to analyze fluid samples concurrently as defined in claim 1 wherein one of the fluid samples introduced into one of said sampling orifices is a reference compound for facilitating accuracy of mass measurements by said detector apparatus.

14. An improved mass spectrometer apparatus being operative to analyze fluid samples concurrently as defined in claim 1 wherein said fluid introduction means includes an electrospray ionization spray means for ionizing and spraying each fluid sample into one of said sampling orifices.

15. An improved mass spectrometer apparatus being operative to analyze fluid samples concurrently as defined in claim 14 wherein said fluid introduction means includes a plurality of electrospray ionization spray means for separately ionizing and spraying of each different fluid sample into a unique one of the plurality of said sampling orifices in order to minimize mixing therebetween.

16. An improved mass spectrometer apparatus being operative to analyze fluid samples concurrently as defined in claim 1 wherein said sampling orifices are configured with an internal diameter sufficiently small to maintain the desired low pressure level within the primary reduced pressure chamber.

17. An improved mass spectrometer apparatus being operative to analyze fluid samples concurrently as defined in claim 2 further comprising a flow restrictor means positioned over said guide inlet means of said quadrupole ion guide to facilitate movement of fluid sample into said quadrupole ion guide.

18. An improved mass spectrometer apparatus being operative to analyze fluid samples concurrently as defined in claim 17 wherein said flow restrictor means comprises a skimmer means.

19. A method, comprising introducing multiple separate samples concurrently into a mass spectrometer including:

conveying a plurality of individual samples from an introducer having a plurality of electrospray ionizers to a nozzle having a plurality of sampling orifices, the nozzle preventing mixing of the individual samples, each of the plurality of sampling orifices including an inlet positioned adjacent one of the plurality of electrospray ionizers;

conveying the plurality of individual samples from the nozzle to an inlet guide through a sample housing defining a reduced pressure chamber; and conveying the plurality of individual samples from the inlet guide to an ion guide, wherein the plurality of individual samples are maintained with minimal interaction between the plurality of samples.

20. The method of claim 19, further comprising conveying the plurality of individual samples from the ion guide to a time of flight mass spectrometer with minimal interaction between the plurality of samples.

21. The method of claim 19, further comprising introducing a reference standard through the introducer and maintaining the reference standard with minimal interaction with the plurality of samples.

22. An apparatus for introducing multiple separate samples concurrently into a mass spectrum analyzer, comprising:

an introducer having a plurality of electrospray ionizers;

a nozzle coupled to the introducer, the nozzle including a plurality of sampling orifices, the nozzle preventing mixing of a plurality of samples, each of the sampling orifices including an inlet positioned adjacent one of the electrospray ionizers;

a sample housing coupled to the nozzle, the sample housing defining a reduced pressure chamber;

an inlet guide coupled to the sample housing; and an ion guide coupled to the inlet guide.

23. The apparatus of claim 22, wherein the inlet guide includes a flow restrictor that includes a skimmer and the ion guide includes a quadripole ion guide.

24. The apparatus of claim 22, wherein the nozzle includes a heater.

* * * * *

CERTIFICATE OF CORRECTION

PATENT NO. : 6,465,776 B1
DATED : October 15, 2002
INVENTOR(S) : Moini et al.

It is certified that error appears in the above-identified patent and that said Letters Patent is hereby corrected as shown below:

Title page,
Item [54], please delete "MASS SPECTROMETER APPARATUS FOR ANALYZING MULTIPLE FLUID SAMPLES CONCURRENTLY" and replace with -- MASS SPECTROMETER FOR ANALYZING MULTIPLE FLUID SAMPLES CONCURRENTLY -- therefor.

Item [57], ABSTRACT,
Please delete "A mass spectrometer utilizing an inlet nozzle having multiple atmospheric pressure inlets to provide multiple streams of different fluid samples such that their chemical contents can be analyzed simultaneously within a single mass spectrometer with limited or no interaction between the individual streams of sample. This capability is made possible by positioning the nozzle within a nozzle housing wherein the nozzle defines a plurality of orifices extending therethrough from the atmospheric pressure environment of the orifice inlets to the reduced air pressure environment of the nozzle outlets without allowing any mixing between the samples as they pass through the nozzle. Samples are provided to the nozzle by an electrospray ionization needle which simultaneously ionizes the fluid and supplies it to one individual nozzle orifice. Multiple electrospray ionization spray means are provided with one for each fluid sample to prevent mixing therebetween and to facilitate simultaneous analysis of different fluid samples within a mass spectrometer particularly as used within a time-of-flight mass spectrometer. The nozzle allows the samples to pass into a quadrupole ion guide which carries the sample into the detector apparatus for analysis thereof." and replace with

UNITED STATES PATENT AND TRADEMARK OFFICE
CERTIFICATE OF CORRECTION

PATENT NO. : 6,465,776 B1
DATED : October 15, 2002
INVENTOR(S) : Moini et al.

It is certified that error appears in the above-identified patent and that said Letters Patent is hereby corrected as shown below:

ABSTRACT, cont'd.

-- Methods and apparatus for introducing multiple separate samples into a mass spectrometer are disclosed. A method includes introducing multiple separate samples concurrently into a mass spectrometer by: conveying a plurality of individual samples from an introducer having a plurality of electrospray ionizers to a nozzle having a plurality of sampling orifices, the nozzle preventing mixing of the individual samples, each of the plurality of sampling orifices including an inlet positioned adjacent one of the plurality of electrospray ionizers; conveying the plurality of individual samples from the nozzle to an inlet guide through a sample housing defining a reduced pressure chamber; and conveying the plurality of individual samples from the inlet guide to an ion guide, wherein the plurality of individual samples are maintained with minimal interaction between the plurality of samples. -- therefor.

Signed and Sealed this

Thirteenth Day of May, 2003

JAMES E. ROGAN
*Director of the United States Patent and Trademark Office*